P. CAUHAPE.
Medicinal Capsules.

No. 146,803.    Patented Jan. 27, 1874.

WITNESSES:

INVENTOR:
P. Cauhape
BY
ATTORNEYS.

UNITED STATES PATENT OFFICE.

PETER CAUHAPE, OF NEW YORK, N. Y.

IMPROVEMENT IN MEDICINAL CAPSULES.

Specification forming part of Letters Patent No. 146,803, dated January 27, 1874; application filed November 22, 1873.

*To all whom it may concern:*

Be it known that I, PETER CAUHAPE, of the city, county, and State of New York, have invented a new and Improved Medicinal Pearl or Capsule, of which the following is a specification:

My invention consists of round or spherical pearls or capsules, of gelatine or other substance with which medicines are coated to prevent tasting; and it also consists of a tool constructed in a peculiar way, whereby it is adapted for making them round.

Figure 1:
Figure 3:
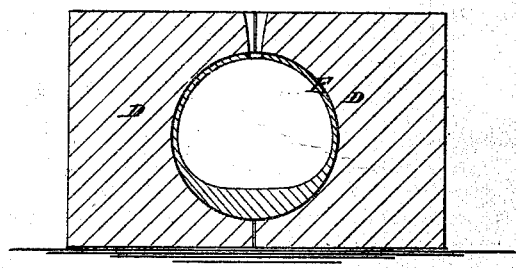
Figure 4:
Figure 2:

Figure 1 in the drawing is a side elevation of the said tool. Fig. 2 is a side elevation of my improved pearl. Fig. 3 is a section of a pearl, and a holder in which it is placed to be filled. Fig. 4 is a side elevation of the common capsule.

The method of making the pearl or capsule sacks of gelatine consists of dipping the ball A in the gelatine in a liquid state, of such low temperature that a thin film will adhere to and solidify on the ball when lifted out, sufficiently to form an elastic envelope, which may be pulled off the ball by the fingers, and placed in a mold or holder, D, with the mouth upward, to be filled with the medicine, after which the mouth is sealed up.

Heretofore round balls have been used for making these little cups or sacks, and the sacks produced have always been elongated, as at F, in consequence of the semi-liquid substance flowing or settling down to the bottom while the ball was removed, and before it cooled and hardened sufficiently to remain alike in all parts upon the ball.

Now, I have found that, by flattening the ball to a certain extent at the bottom, as shown at B, the accumulation of the material thereat, when the ball is removed from the mass, will be just sufficient to make the sack round, as at *r*, thus making, when sealed at the top, a completely round article, which is much better in respect of appearance, and is more acceptable to the public than in the old form.

The sectional figure of the sack in Fig. 3 shows how the substance accumulating at the bottom produces the round form by thickening the bottom.

Having thus fully described my invention, what I claim as new, and desire to secure by Letters Patent, is—

1. As a new article of manufacture, a round pearl or capsule, substantially as and for the purpose set forth.

2. A dipping-tool for the manufacture of round pearls, having the bottom flattened, as described.

P. CAUHAPE.

Witnesses:
A. P. THAYER,
T. B. MOSHER.